UNITED STATES PATENT OFFICE 2,126,019

PLASTICIZER FOR RUBBER DERIVATIVES

Arnold Kirkpatrick, St. Louis, Mo., assignor to Monsanto Chemical Company, St. Louis, Mo., a corporation of Delaware No Drawing. Application October 7, 1935, Serial No. 43,921

10 Claims. (Cl. 106—23)

The present invention relates to rubber derivatives and it has particular relation to such derivatives as may be obtained by treating rubber or rubber containing materials with chlorine, hydrogen chlorine, or polymerizing or isomerizing agents of various kinds.

The main objects of the invention are (a) to provide a composition containing a rubber derivative as its principal ingredient which is chemically inert with respect to alkalis, acids and other agents of corrosion, highly flexible, strongly adherent to most structural materials and capable of forming paint and lacquer films especially suitable for coating chemical equipment and other objects which are exposed to the action of agencies of corrosion and (b) to provide highly durable, moisture proof films suitable for wrapping and preserving food stuffs etc.

These and other objects will be apparent from cosideration of the following description and the appended claims.

Derivatives of rubber, such as those obtained by acting upon rubber with chlorine, hydrogen chloride, bromine and the like, or polymers and addition products of rubber such as may be obtained by treating rubber in solution or in solid state with a halide of a metal, notably an amphoteric metal or other isomerizing or addition product forming agents such as sulfonic acids, (e. g. p.toluenesulfonic acid) have heretofore been observed to be highly resistant to attack by acids, alkalis and other agencies of corrosion, and their use for forming apparatus or for coating apparatus exposed to the action of these agencies has been proposed. However, development of such applications has in the past been greatly retarded by reason of the fact that these rubber derivatives were relatively brittle products and were difficult to form into bodies and films suitable for use in the industries, and if so formed, they were so inflexible that they soon cracked and failed. It has heretofore been proposed to overcome these defects by incorporating into the rubber compounds or derivatives modifying agents termed plasticizers and having the property of rendering the material flexible and plastic.

Although scores of plasticizing agents, such as dibutyl phthalate and the like, suitable for use i various resin-like bodies including nitrocellulose, Bakelite, alkyd type resins and natural resins were known to those skilled in the art and these would suggest themselves for use in the rubber derivatives, in actual practice none of these was satisfactory. This was true because few of the proposed compounds possessed an adequate degree of compatibility with the rubber derivatives to admit of incorporation thereof in sufficient amounts to obtain the requisite degree of plasticity. Furthermore, those materials which tended to be more or less compatible with the rubber derivatives were found to be of such volatile nature that after incorporation into the derivatives and exposure to air and light the plasticizer soon evaporated leaving the films or bodies which they were designed to plasticize practically unprotected.

The present invention involves the discovery that certain amido compounds, derived by reaction of a secondary cyclohexylamine with a carboxylic acid or preferably the anhydride of such carboxylic acid, are highly miscible and compatible with rubber derivatives and may be employed to form masses of excellent plasticity and flexibility. Furthermore, these plasticizers are relatively permanently retained in the materials which are to be plasticized. The compounds, the use of which is embraced in this invention, may be represented by the type formula

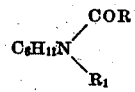

where R and $R_1$ are like or unlike open chain or cyclical aliphatic hydrocarbon radicals. Examples of radicals which may occur in either or both of the positions, R and $R_1$, are methyl, ethyl, propyl, butyl, amyl, cyclohexyl and the like. Acetyl-butyl-cyclo-hexylamine constitutes a specific and typical example of a material of this class, and its preparation and application will be described in detail. It is to be understood that this description is merely for purposes of illustrating the type of compound contemplated and that it also applies in similar manner to the other materials which are embraced within the scope of the invention.

N,N-acetyl-n-butyl-cyclohexylamine was prepared by reacting with agitation, about 1300 parts by weight of cyclohexylamine and 200 parts by weight of n-butyl chloride under a reflux condenser at a temperature near the boiling point. The butyl chloride was added at approximately the rate at which it was taken up in the reaction and this rate in general is fairly slow, though it may be increased or decreased in accordance with the degree of agitation or thoroughness of distribution of the butyl chloride in the mixture. The temperature of reaction and the agitation preferably were maintained for a period of about 2½ hours after the completion of the addition of butyl chloride. The reaction mixture was then cooled and at the beginning of the separation of the crystalline product, there were added with agitation about 200 parts by weight of a 50% solution of sodium hydroxide. This solution preferably is diluted, prior to addition, though of course the full amount is retained. The mixture was then poured into a suitable separating device, such as a separatory funnel and shaken thoroughly and allowed to separate into layers, of which the water layer was drawn off and discarded. To effect complete removal of all hydrochloric acid present, there was added a little of a solution (e. g. 25% solution) of sodium hydroxide and the mixture was further agitated. If any water layer tended to separate, this was also drawn off. For purposes of removing the excess cyclohexylamine, the product was subjected to distillation under a vacuum. The butylated cyclohexylamine came over at a temperature of about 80° C. and under a vacuum of 10 m. m. Upon redistillation the main portion of the product came over at an almost constant boiling point of 84–85° C. under a pressure of 12 m. m. Hardly any residue remained.

The acetylation of the product was effected by agitating while cooling 100.5 parts by weight of the normal butyl cyclohexylamine prepared as above described with 75 parts by weight of acetic anhydride of 98% purity. The mixture was then gradually heated, preferably under a reflux condenser until the temperature reached 100° C. and after one-half hour heating, five additional parts of anhydride were added, and the temperature held at 100° C. for 1½ hours. The reaction product was poured into cold water under agitation and the resultant liquid was transferred to a separatory funnel and the aqueous fraction which separated was drawn off. The aqueous layer was washed with benzene and benzene was also added to the oily layer which constituted the main reaction product. These mixtures were then shaken with water and left to settle over night after which they were washed twice with dilute hydrochloric acid and then twice with water. Next the washed product was shaken with potassium carbonate and permitted to dry over an additional quantity of potassium carbonate. The dried product was filtered to remove the potassium carbonate and was then washed with benzene and the benzene distilled off under vacuum. A fraction consisting of 122 parts by weight of a water white liquid boiling at about 145° C. under a pressure of 8 m. m. (absolute) was obtained. The yield was 96% of the theoretical value.

As previously intimated, the above described cyclohexylamine derivatives may be employed to plasticize such rubber compounds as conventional rubber chlorides of the type sold commercially under the trade name, "Tornesit". Products sold under such trade names as "Pliolite", "Plioform" are also applicable. Rubber hydrochloride prepared by the methods disclosed by United States Patent 1,989,632 and which may or may not be treated with the antioxidants therein disclosed are readily plasticized by means of acetylated and alkylated cyclohexylamines. The same is also true of the rubber addition products and isomers obtained by the action of such agents as the halides of amphoteric metals, notably tin tetrachloride upon rubber. Some of the methods of preparing this latter type of compound are described in an article by H. A. Bruson, L. B. Sebrell and W. C. Calvert, vol. 19, Industrial and Engineering Chemistry, page 1033, and in Sebrell British Patent 310,461. Neutralized products referred to but excluded from the scope of the British patent are also embraced by the present invention. These may be prepared by boiling or otherwise treating with water the product obtained by action of tin tetrachloride upon solutions of rubber. The product may be treated with water in order to hydrolize and thus to neutralize any of the free isomerizing agent present. Other similar rubber products which may be plasticized are obtained by treating rubber with a material containing a sulfo group (e. g. P-toluenesulfonic acid or sulfon chloride).

For purposes of making a film forming composition suitable for coating purposes, e. g. for coating chemical apparatus to inhibit corrosion, the rubber derivatives may be dissolved in a suitable solvent such as benzol, toluol, gasoline, ethylene dichloride and the like in an amount sufficient to give a product of the desired fluidity and the plasticizer added thereto in any convenient way.

Commonly the rubber derivative will amount to 20–30% of the solvent employed. The amount of plasticizer will vary in accordance with the degree of plasticity desired in the product. However, in most cases, it will amount to 25–60% based upon the resin content of the solution. If desired, anti-oxidants or age retarders, for rubber or rubber derivatives, such as phenyl-alpha or phenyl-beta naphthylamine, diphenylamine, beta beta dinaphthol or the products obtained by reacting multimolar proportions of an amine, such as aniline, with an aldehyde, such as butylaldehyde, crotonaldehyde, or the like, at a low temperature, may be added. These of course are to be understood as conventional anti-oxidants for rubber compounds and other conventional anti-oxidants may be employed in lieu thereof, if desired. The new compositions may be applied by conventional methods. These of course include spraying, brushing and dipping. Wrapping films may be formed from solutions by conventional methods and molded products may be made up by incorporation of the rubber derivative with a suitable amount of plasticizer to give a desired degree of flexibility and plasticity to the composition and then shaping with suitable dies. The molding compositions may also be further admixed with fillers such as asbestos, wood flour and the like which are employed in the preparation of molded compositions from Bakelite and similar materials.

The alkylated and acetylated cyclohexylamine compounds are relatively inexpensive to prepare. They are of low volatility and highly resistant to discoloration by the action of light. They also possess little or no objectionable odor. Furthermore, they may be incorporated into the rubber compounds with conventional methods, for example, by milling upon ordinary mills employed in the rubber industry. For these and other reasons the new plasticizers are highly desirable from a commercial view-point and their use in various rubber derivatives admits of the employment thereof in the chemical and other industries to a far greater extent than has heretofore been possible.

Although only the preferred embodiments of the invention have been disclosed, it is to be understood that these embodiments are given only by way of example and that numerous modifications may be made therein without departure from the spirit of the invention or the scope of the appended claims.

What I claim is:

1. As a new composition of matter, a material comprising a normally hard, brittle derivative of rubber selected from the class consisting of polymers and addition products of rubber, said derivatives being admixed with a substantial amount of material of the formula

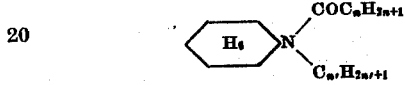

where $n$ and $n'$ are like or unlike whole numbers not less than 1 or greater than 6.

2. A composition of matter comprising a normally hard, brittle polymer of rubber, admixed with a material of the formula

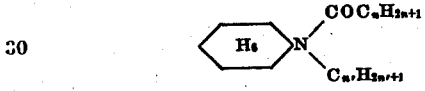

where $n$ and $n'$ are like or unlike whole numbers not less than 1 or greater than 6 in an amount sufficient to render the polymer relatively flexible and plastic.

3. A composition of matter comprising a normally hard, brittle addition product of rubber and a halide of an amphoteric metal admixed with a material of the formula

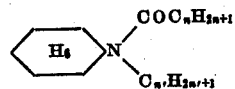

where $n$ and $n'$ are like or unlike whole numbers not less than 1 or greater than 6.

4. As a new composition of matter, the material defined in claim 1 when admixed with an age retarder.

5. As a new composition of matter, the material defined in claim 3 when admixed with a secondary aromatic amine as an age retarder.

6. As a new composition of matter, a normally hard, brittle derivative of rubber, said derivative being admixed with N-acetyl, N-butyl cyclohexylamine.

7. As a new composition of matter a derivative of rubber formed in the presence of a chloride of an amphoteric metal admixed with a reaction product of an aliphatic carboxylic acid and a secondary N-alkylated cyclohexylamine.

8. As a new composition of matter the material defined in claim 6 in which the rubber derivative is obtained by reaction of rubber and a halide of an amphoteric metal.

9. As a new composition of matter a rubber polymer admixed with an N-acetylated and N-alkylated cyclohexylamine.

10. As a new composition of matter a rubber hydrochloride admixed with N-acetylated and N-alkylated cyclohexylamine.

ARNOLD KIRKPATRICK.